US006967783B2

(12) United States Patent
Noda

(10) Patent No.: US 6,967,783 B2
(45) Date of Patent: Nov. 22, 2005

(54) TWO-GROUP ZOOM LENS

(75) Inventor: Takayuki Noda, Saitama (JP)

(73) Assignee: Fujinon Corporation, Saitama (JP)

( * ) Notice: Subject to any disclaimer, the term of this patent is extended or adjusted under 35 U.S.C. 154(b) by 66 days.

(21) Appl. No.: 10/776,189

(22) Filed: Feb. 12, 2004

(65) Prior Publication Data

US 2004/0174613 A1 Sep. 9, 2004

(30) Foreign Application Priority Data

Mar. 3, 2003 (JP) ....................................... 2003-055380

(51) Int. Cl.[7] ................................................ G02B 15/14
(52) U.S. Cl. ....................................... 359/691; 359/692
(58) Field of Search .................................. 359/676–692

(56) References Cited

U.S. PATENT DOCUMENTS

| | | | | |
|---|---|---|---|---|
| 4,999,007 A | | 3/1991 | Aoki et al. | 359/676 |
| 5,663,836 A | | 9/1997 | Ogata | 359/691 |
| 6,762,887 B2 | * | 7/2004 | Tomioka | 359/691 |
| 2003/0179465 A1 | * | 9/2003 | Noda | 359/691 |

FOREIGN PATENT DOCUMENTS

| | | |
|---|---|---|
| JP | 2001-21806 | 1/2001 |

* cited by examiner

*Primary Examiner*—Scott J. Sugarman
*Assistant Examiner*—M. Hasan
(74) *Attorney, Agent, or Firm*—Arnold International; Jon W. Henry; Bruce Y. Arnold

(57) ABSTRACT

A zoom lens is disclosed that is formed of only two lens groups. The first lens group includes, from the object side, a plastic lens element having negative refractive power and an aspheric surface, and a lens element having positive refractive power. The second lens group includes, from the object side: a biconvex lens element having an aspheric surface; a lens element having negative refractive power, a smaller curvature on its object side, and with its image-side surface joined to a biconvex lens element. The zoom lens satisfies specified conditions to: (a) allow for ease of manufacture and assembly while maintaining favorable correction of various aberrations, (b) assure that the zoom lens is compact in both the operational and retracted positions, (c) assure that the zoom lens is not easily damaged, and (d) assure that the optical performance is well-maintained despite changes in ambient conditions, such as temperature.

20 Claims, 13 Drawing Sheets

Distortion

Astigmatism

Spherical Aberration

Distortion

Astigmatism

Spherical Aberration

Spherical Aberration

Astigmatism

Distortion

Spherical Aberration

Astigmatism

Distortion

Distortion

Astigmatism

Spherical Aberration

Spherical Aberration

Astigmatism

Distortion

TWO-GROUP ZOOM LENS

BACKGROUND OF THE INVENTION

It is conventional in two-group zoom lenses used for digital still cameras, surveillance TV cameras and similar imaging devices that use an imaging element, such as a CCD or a CMOS, to use plastic lenses that can be easily mass produced and are light in weight in order to meet the requirements of miniaturization, weight reduction, and cost reduction. Because the correction of chromatic aberrations as well as the compensation for variation in focal length of zoom lenses due to the variation in refractive index with temperature that occurs with plastic material are difficult to achieve, techniques have been proposed to resolve these problems by using aspheric plastic lens elements as set forth, for example, in Japanese Laid-Open Patent Application 2001-021806. In such a two-group zoom lens, it is common to perform focusing by moving the object side lens group of the two-group zoom lens. However, such conventional two-group zoom lenses using plastic lens elements leave much room for improvement in terms of miniaturization, weight reduction, and cost reduction.

BRIEF SUMMARY OF THE INVENTION

The present invention relates to a two-group zoom lens, especially a compact and light-weight two-group zoom lens, that favorably corrects for various aberrations while achieving miniaturization, weight reduction, and cost reduction, and is particularly well suited for use in digital still cameras, surveillance TV cameras, and similar imaging devices that use an image detecting element such as a CCD or a CMOS.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
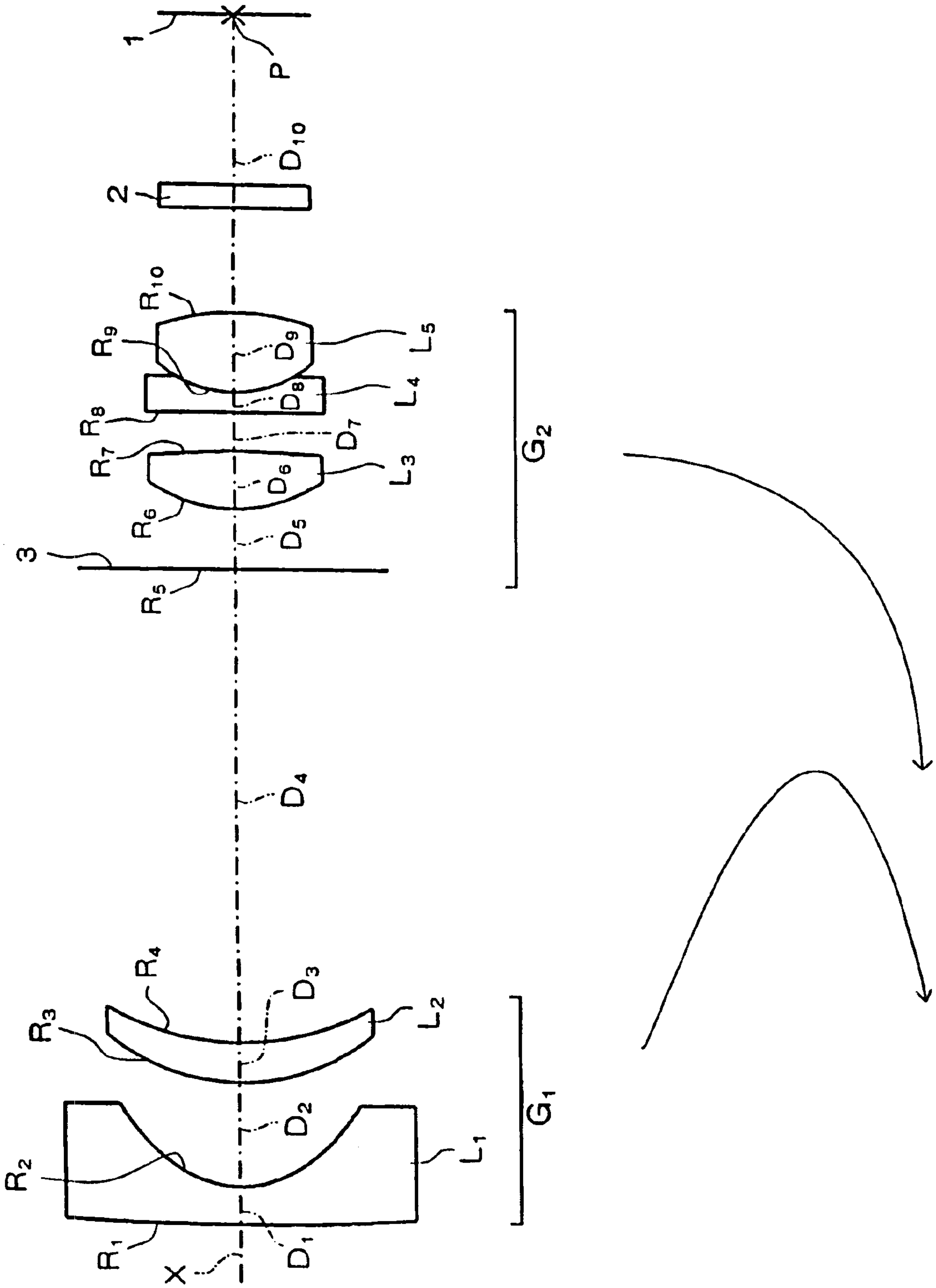
FIG. 1 shows a cross-sectional view of Embodiment 1 of the zoom lens of the present invention at the wide-angle end, along with arrows that indicate the movement of the lens groups when zooming from the wide-angle end to the telephoto end.

A general description of the two-group zoom lens of the present invention that pertains to the three disclosed embodiments of the invention will first be described with reference to FIG. 1 that shows Embodiment 1. In FIG. 1, lens elements are referenced by the letter L with a subscript denoting their order from the object side of the zoom lens along the optical axis X, from $L_1$ to $L_5$. Similarly, radii of curvature of the optical surfaces are referenced by the letter R with a subscript denoting their order from the object side of the zoom lens, from $R_1$ to $R_{10}$. The on-axis surface spacings along the optical axis X of various optical surfaces are referenced by the letter D with a subscript denoting their order from the object side of the zoom lens, from $D_1$ to $D_{10}$. In the same manner, the two lens groups are labeled $G_1$ and $G_2$ in order from the object side of the zoom lens and the optical components belonging to each lens group are indicated by brackets adjacent the labels $G_1$ and $G_2$.

The term "lens group" is defined in terms of "lens elements" and "lens components" as explained herein. The term "lens element" is herein defined as a single transparent mass of refractive material having two opposed refracting surfaces that are oriented at least generally transverse to the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is used herein to define an assembly of one or more lens components that are fixed or are movable as a single unit. As shown in FIG. 1, the two-group zoom lens is formed of, in order from the object side, a first lens group $G_1$ of negative refractive power and a second lens group $G_2$ of positive refractive power. The second lens group $G_2$ includes a stop 3 that controls the amount of light passing through the zoom lens and is positioned at the object side of the second lens group $G_2$. Also, a plane parallel plate 2 (such as a cover glass) is positioned between the second lens group $G_2$ and the image plane 1 which is centered at the axial point P. An image detecting device (not shown), such as a CCD, may be positioned at the image plane to capture the image.

In order to improve imaging, at least some of the lens surfaces of the two-group zoom lens are aspheric. All of the aspheric lens surfaces of the zoom lens are defined using the following Equation (A):

$$Z=[(Y^2/R)/\{1+(1-K\cdot Y^2/R^2)^{1/2}\}]+\Sigma(A_i\cdot|Y^i|) \qquad \text{(Equation A)}$$

where

Z is the length (in mm) of a line drawn from a point on the aspheric surface at a distance Y from the optical axis to the tangential plane of the aspheric surface vertex, R is the radius of curvature (in mm) of the aspheric surface on the optical axis, Y is the distance (in mm) from the optical axis, K is the eccentricity of the aspheric lens surface, and $A_i$ is the ith aspheric coefficient, and the summation extends over i.

In embodiments of the invention disclosed below, only the aspheric coefficients $A_4$, $A_6$, $A_8$, and $A_{10}$ are non-zero.

As shown in the bottom portion of FIG. 1, the two-group zoom lens is constructed so that, when zooming from the wide-angle end to the telephoto end, the first lens group $G_1$ and the second lens group $G_2$ are moved along the optical axis X so that the spacing between them decreases. Additionally, focusing is performed by moving the second lens group $G_2$ along the optical axis X. The top portion of FIG. 1 shows a cross-sectional view of the construction of Embodiment 1 and the bottom portion shows directional arrows that indicate the movements of the lens groups $G_1$ and $G_2$ when zooming from the wide-angle end to the telephoto end.

The first lens group $G_1$ includes, in order from the object side, a first lens element $L_1$ of negative refractive power that is made of plastic (i.e., synthetic resin) and has at least one aspheric lens surface, and a second lens element $L_2$ of positive refractive power.

The second lens group $G_2$ may be formed of, in order from the object side: a diaphragm stop 3 that functions as an aperture stop to vary the amount of light passing through the zoom lens; a first lens component consisting of a first lens element such as lens element $L_3$ having a biconvex shape and made of plastic with at least one lens surface aspheric; and a second lens component that includes, in order from the object side, a lens element such as $L_4$ having negative refractive power with the absolute value of the curvature of its object-side lens surface being smaller than the absolute value of the curvature of its image-side lens surface. The lens element $L_4$ may be a plano-concave lens element and is joined at its image side to the lens element $L_5$ so as to form a lens component, as defined above. For example, the lens elements $L_4$ and $L_5$ may be cemented together.

The two-group zoom lens of the present invention satisfies the following Conditions (1)–(3):

$$B^{1/2} < f_{G2}/f_w < 0.9 \cdot B \quad \text{Condition (1)}$$

$$-2.0 < f_{G1\text{-}1}/f_W < -1.5 \quad \text{Condition (2)}$$

$$R_{G2\text{-}1}/f_W > 0.8 \quad \text{Condition (3)}$$

where

B is the zoom ratio of the two-group zoom lens, namely, the ratio of the focal length at the telephoto end divided by the focal length at the wide-angle end, $f_{G2}$ is the focal length of the second lens group $G_2$, $f_W$ is the focal length of the two-group zoom lens at the wide-angle end, $f_{G1\text{-}1}$ is the focal length of the first lens element of the first lens group $G_1$, and $R_{G2\text{-}1}$ is the radius of curvature of the object-side lens surface of the first lens element of the second lens group $G_2$.

Satisfying Condition (1) helps maintain a good balance between the curvature of field and the distortion and prevents the back focus distance from becoming too large. By satisfying the lower limit of Condition (1), the curvature of field and the distortion are well-balanced. By satisfying the upper limit of Condition (1), the back focus distance is kept sufficiently small so that miniaturization of the two-group zoom lens can be achieved.

Satisfying Condition (2) helps correct various aberrations, assures a proper back focus distance, and reduces the size of the zoom lens by helping to keep the second lens group small. By satisfying the lower limit of Condition (2), various aberrations occurring in the first lens group $G_1$ are kept small and this aids in balancing of aberrations occurring in the second lens group $G_2$. Satisfying the upper limit of Condition (2) helps minimize the size of the two-group zoom lens by miniaturizing the second lens group $G_2$ while maintaining an appropriate back focus distance for the two-group zoom lens.

Satisfying Condition (3) helps suppress the degradation of optical performance that tends to result when increasing the separation of the first lens element of the second lens group $L_3$ from the stop 3.

Also, preferably the following Condition (4) is satisfied:

$$|f_{G1}/f_W| < 3 \cdot B \quad \text{Condition (4)}$$

where $f_{G1}$ is the focal length of the first lens group $G_1$, fw is as defined above, and B is as defined above.

The first lens group $G_1$ is moved in order to perform a compensating function during zooming, and satisfying Condition (4) allows the amount of movement of the first lens group $G_1$ that is required for such compensation to be small. Thus, satisfying Condition (4) assists in keeping the overall length (both in the operational position and in the retracted position) of the two-group zoom lens small.

Additionally, preferably, the following Condition (5) is satisfied:

$$|f_W/R_1| < 0.08 \quad \text{Condition (5)}$$

where fw is as defined above, and $R_1$ is the radius of curvature of the object-side lens surface of the first lens element $L_1$ of the first lens group $G_1$.

In addition, the following Condition (6), that is more restrictive than Condition (5), is preferably satisfied:

$$|f_W/R_1| < 0.025 \quad \text{Condition (6).}$$

Conditions (5) and (6) are conditions that assure the easy manufacture of the first lens element $L_1$ and prevent damage to the first lens element $L_1$. If a two-element construction is used for the first lens group $G_1$, with the first lens element $L_1$ having negative refractive power and the second lens element $L_2$ having positive refractive power, as in the present invention, the refractive power of the first lens element $L_1$ tends to be large, generating substantial negative (i.e., barrel) distortion. Thus, in the present invention, the first lens element $L_1$ is made of plastic and includes at least one aspheric lens surface.

In manufacturing a lens made of plastic, the smaller the curvature of a lens surface, the easier it is to form the lens surface with a precise curvature. Also, if the first lens element $L_1$ is made to have negative refractive power and a convex lens surface on its object side, the more the curvature of the convex lens surface is increased, the greater the depression of the concave lens surface on its image side becomes. Therefore, in order to form the lens surface with a precise curvature, it is preferable to make the shape of the object-side lens surface of the first lens element $L_1$ nearly planar.

Also, because the first lens element $L_1$ is plastic, it is likely to be scratched. Therefore, if the object-side lens surface of the first lens element $L_1$ is a convex lens surface having a small radius of curvature, when foreign matter contacts the convex lens surface local forces are applied that may cause damage to the lens surface.

Furthermore, in order to reduce the overall length of the two-group zoom lens when the zoom lens is retracted, it is preferable to make the shape of the object-side lens surface of the first lens element $L_1$ nearly planar.

Additionally, preferably the following condition is satisfied:

$$10<|f_{G2\text{-}2,3}/f_W|<100 \quad \text{Condition (7)}$$

where $f_{G2\text{-}2,3}$ is the composite focal length of the second lens element $L_4$ and the third lens element $L_5$ of the second lens group $G_2$, and fw is as defined above.

Condition (7) helps to correct chromatic aberration and suppress degradation of image performance associated with temperature variations of the lens component that is formed by joining lens elements $L_4$ and $L_5$ of the second lens group $G_2$. If the absolute value of the ratio of Condition (7) is below the lower limit, the lens component formed of lens elements $L_4$ and $L_5$ is less able to correct chromatic aberrations. On the other hand, if the absolute value of the ratio of Condition (7) is above the upper limit, and lens elements $L_4$ and $L_5$ are made of glass, the effects of the superiority of the characteristics of glass over plastic with temperature variations decrease so much that degradation of imaging performance cannot be avoided.

Embodiments 1–3 of the present invention will now be individually described with further reference to the drawings.

are aspheric lens surfaces with aspheric surface shapes expressed by Equation (A) above.

Table 1 below lists numerical values of lens data for Embodiment 1 based on the focal length of the two-group zoom lens being normalized to 100 mm. Table 1 lists the surface number #, in order from the object side, the radius of curvature R (in mm) of each surface near the optical axis, the on-axis surface spacing D (in mm), as well as the refractive index $N_d$ and the Abbe number $\nu_d$ (at the d-line of 587.6 nm) of each lens element for Embodiment 1. The numerical values for the radii of curvature of aspheric lens surfaces in Table 1 are the values near the optical axis. In Table 1, the radius of curvature is set at infinity (∞) when the optical element surface is planar or when the optical element surface does not refract the light.

TABLE 1

| # | R | D | $N_d$ | $\nu_d$ |
|---|---|---|---|---|
| 1* | 4154.278 | 29.57 | 1.50842 | 56.3 |
| 2* | 81.154 | 84.94 | | |
| 3 | 162.551 | 32.67 | 1.76181 | 26.6 |
| 4 | 214.545 | $D_4$ (variable) | | |
| 5 | ∞ (stop) | 48.92 | | |
| 6* | 117.608 | 46.08 | 1.50842 | 56.3 |
| 7* | −506.128 | 19.77 | | |
| 8 | ∞ | 16.85 | 1.83400 | 37.1 |
| 9 | 92.279 | 64.13 | 1.48749 | 70.4 |
| 10 | −183.286 | $D_{10}$ (variable) | | |

The lens surfaces with a * to the right of the surface number in Table 1 are aspheric lens surfaces, and the aspheric surface shape of these lens elements is expressed by Equation (A) above.

Table 2 below lists the values of the constants K, $A_4$, $A_6$, $A_8$, and $A_{10}$ used in Equation (A) above for each of the aspheric surfaces indicated in Table 1. Aspheric coefficients that are not present in Table 2 are zero. An “E” in the data indicates that the number following the “E” is the exponent to the base 10. For example, “1.0E-02” represents the number $1.0\times10^{-2}$.

TABLE 2

| # | K | $A_4$ | $A_6$ | $A_8$ | $A_{10}$ |
|---|---|---|---|---|---|
| 1 | 1.3213135 | 0.1119585E−7 | −0.4620284E−12 | 0.5731144E−17 | 0.1311926E−22 |
| 2 | −0.2735398 | 0.1562321E−6 | 0.7648349E−12 | 0.5206718E−18 | 0.2036524E−24 |
| 6 | 1.1813229 | −0.3952729E−7 | −0.2530515E−12 | −0.4690102E−16 | 0.1168846E−20 |
| 7 | −3.0665890 | 0.6448203E−7 | 0.1946249E−11 | 0.4507078E−16 | 0.1896153E−20 |

Embodiment 1

In Embodiment 1, as shown in FIG. 1, the first lens group $G_1$ is formed of, in order from the object side, a first lens element $L_1$ of negative refractive power and a meniscus shape with its concave surface on the image side, and a second lens element $L_2$ of positive refractive power and a meniscus shape with its convex lens surface on the object side. The second lens group $G_2$ is formed of, in order from the object side, a stop, a first lens element $L_3$ that is biconvex, a second lens element $L_4$ that is planar on the object side and concave on the image side, and a third lens element $L_5$ that is biconvex. The lens element $L_4$ and the lens element $L_5$ are joined by, for example, being cemented. Additionally, both lens surfaces of lens elements $L_1$ and $L_3$ In the zoom lens of Embodiment 1, both the first lens group $G_1$ and the second lens group $G_2$ move during zooming. Therefore, the on-axis spacing $D_4$ between the two lens groups changes with zooming. With zooming, the focal length f, the back focus distance $D_{10}$, and the f-number of the zoom lens also change. The back focus distance $D_{10}$, is the on-axis distance between the image-side surface of lens element $L_5$ and the image plane 1, as shown in FIG. 1. The back focus distance $D_{10}$, is based on the plane parallel plate 2 of FIG. 1 having a thickness of 12.11 and a refractive index of 1.52. Table 3 below lists the values of the focal length f, the f-number $F_{NO}$, the on-axis surface spacing $D_4$, the back focus distance $D_{10}$, and the field angle 2ω at the wide-angle end (f=100 mm) and at the telephoto end (f=280 mm).

TABLE 3

| f | $F_{NO}$ | $D_4$ | $D_{10}$ | 2ω |
|---|---|---|---|---|
| 100 | 3.11 | 386.76 | 268.75 | 65.0° |
| 280 | 4.65 | 25.65 | 458.51 | 24.8° |

Table 3 shows a zoom ratio of 2.8 from the wide-angle end to the telephoto end. Additionally, the overall length of the two-group zoom lens at the wide-angle end is 991 mm based on the normalized focal length of the two-group zoom lens being 100 mm.

The zoom lens of Embodiment 1 of the present invention satisfies Conditions (1)–(7) above as set forth in Table 4 below.

TABLE 4

| Condition No. | Condition | Values |
|---|---|---|
| (1) | $B^{1/2} < f_{G2}/f_W < 0.9 \cdot B$ | $f_{G2}/f_W = 2.447$, B = 2.8 |
| (2) | $-2.0 < f_{G1-1}/f_W < -1.5$ | −1.656 |
| (3) | $R_{G2-1}/f_W > 0.8$ | 1.1985 |
| (4) | $\lvert f_{G1}/f_W \rvert < 3 \cdot B$ | $\lvert f_{G1}/f_W \rvert = 2.3468$, B = 2.8 |
| (5), (6) | $\lvert f_W/R_1 \rvert < 0.08$ ($< 0.025$) | 0.02362 |
| (7) | $10 < \lvert f_{G2-2,3}/f_W \rvert < 100$ | 14.771 |

Figure 2C:
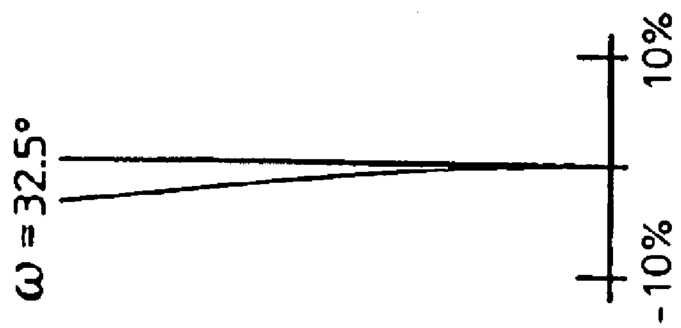
FIGS. 2A–2C show the spherical aberration, astigmatism, and distortion, respectively, of the zoom lens according to Embodiment 1 at the wide-angle end.
Figure 2B:
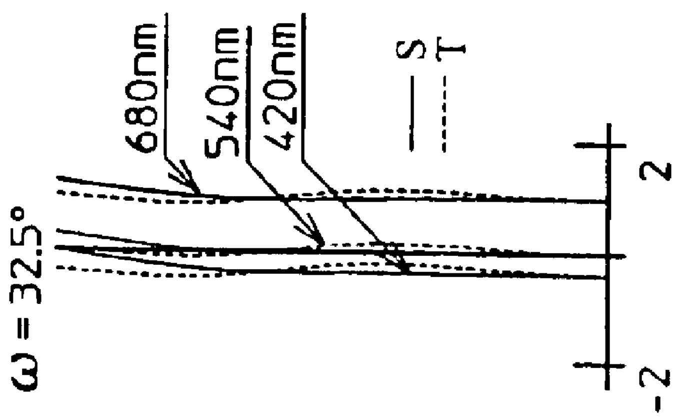
Figure 2A:
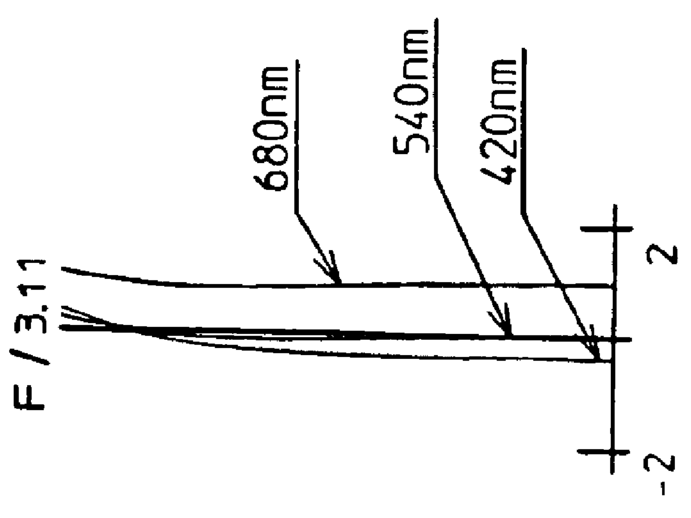
Figure 3:
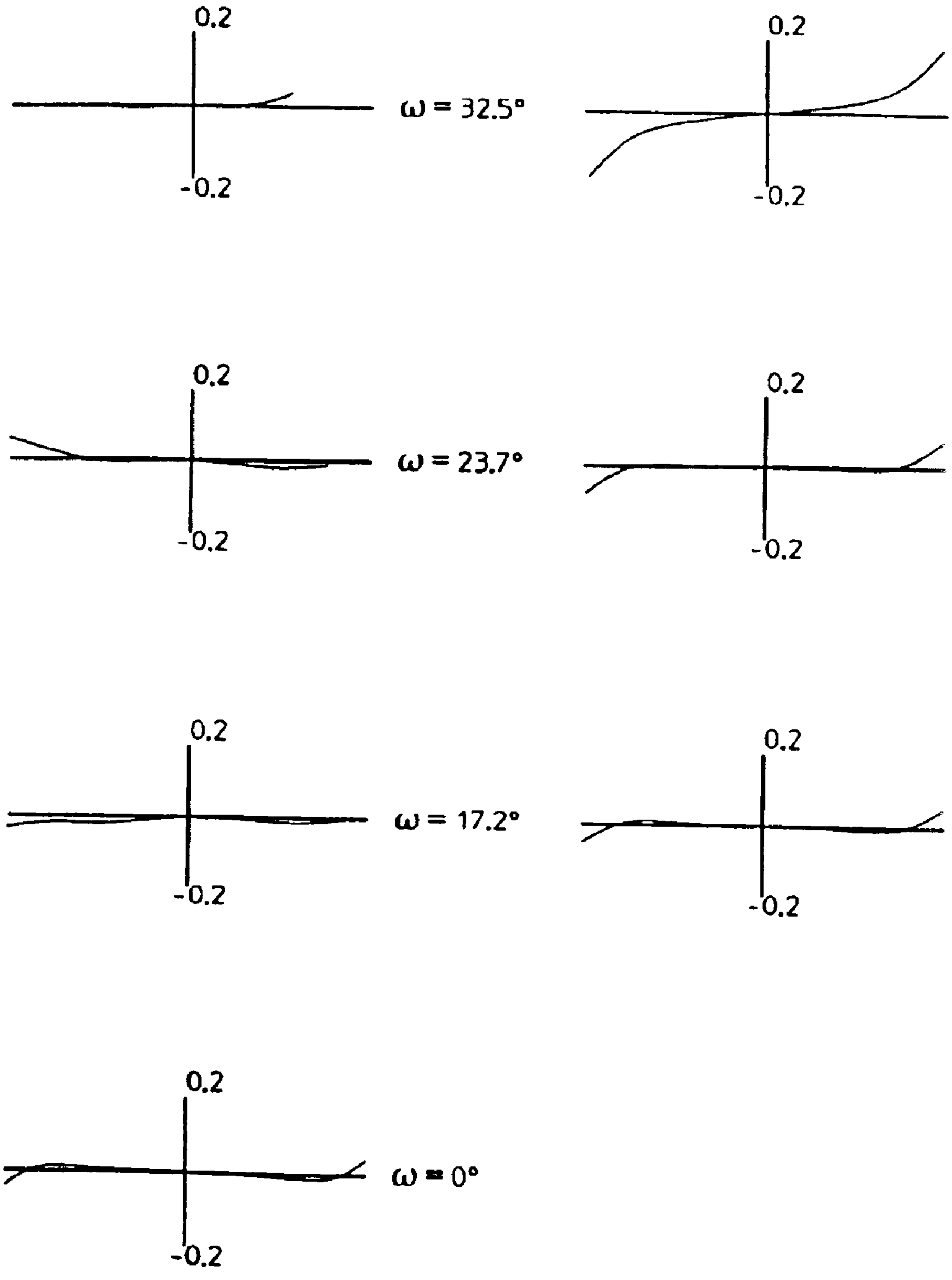
FIG. 3 shows the coma of the zoom lens according to Embodiment 1 at the wide-angle end.
Figure 4C:
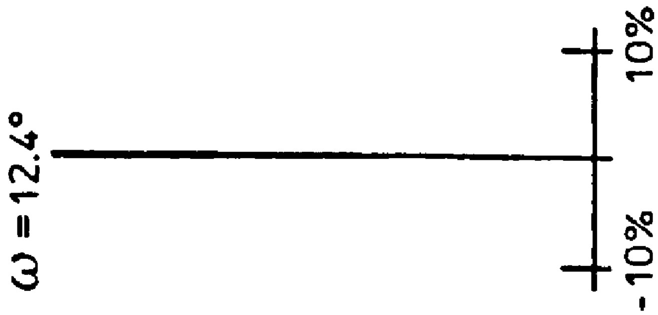
FIGS. 4A–4C show the spherical aberration, astigmatism, and distortion, respectively, of the zoom lens according to Embodiment 1 at the telephoto end.
Figure 4B:
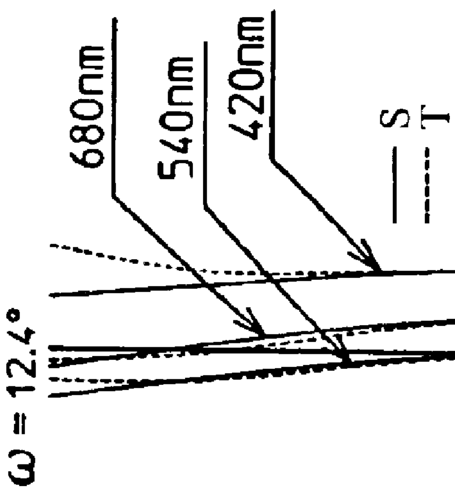
Figure 4A:
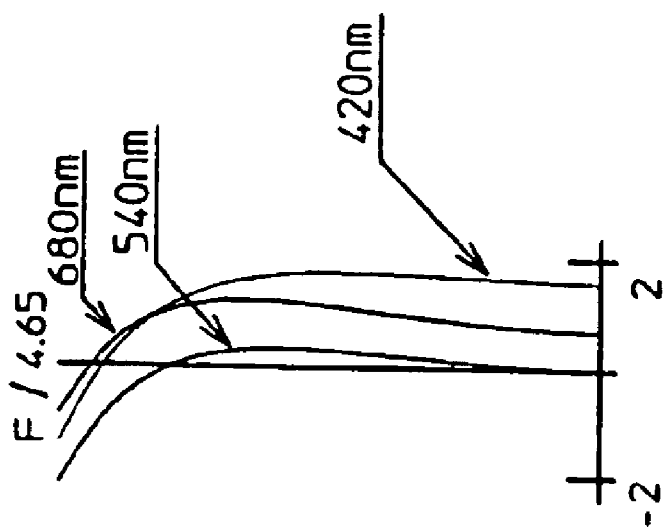
Figure 5:
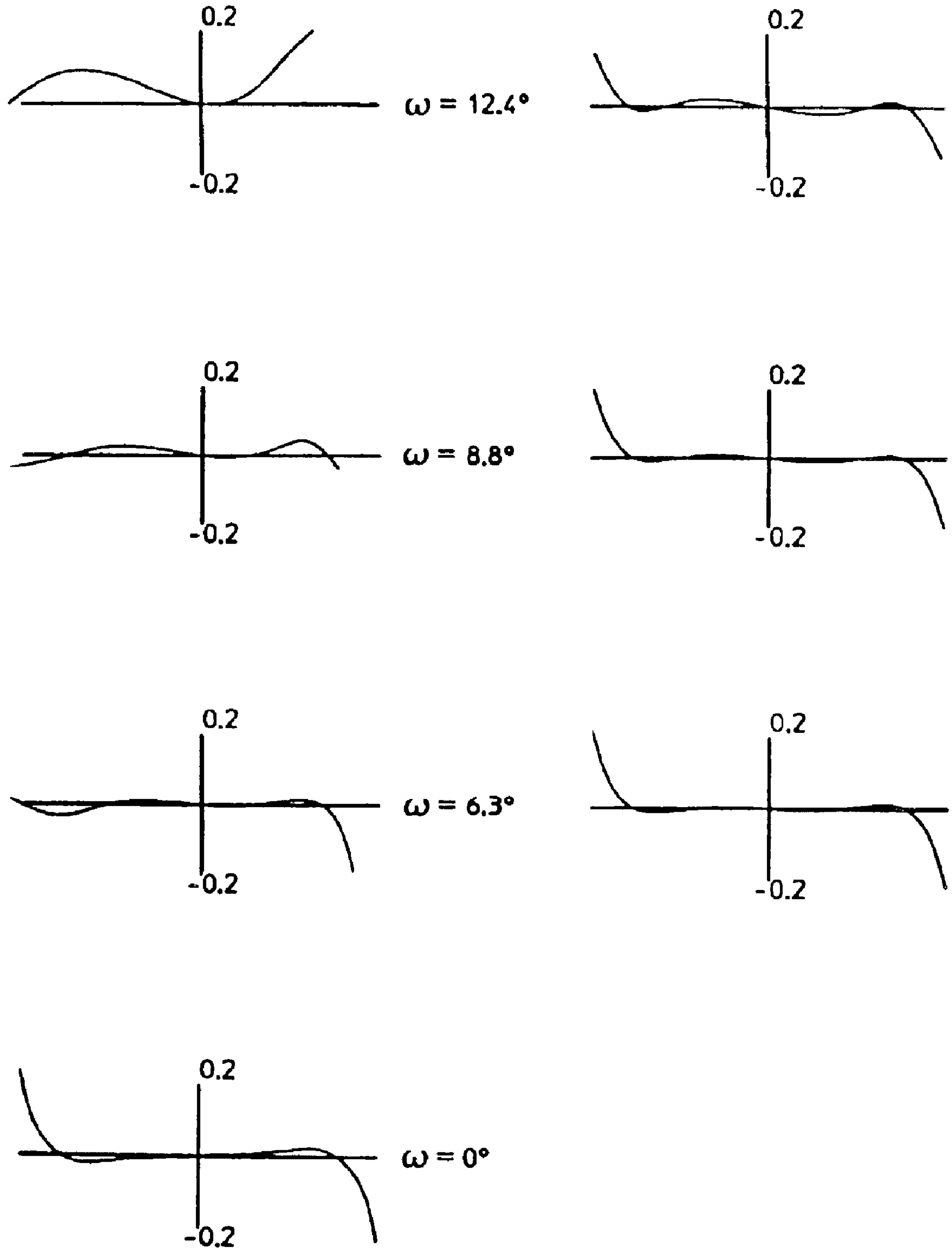
FIG. 5 shows the coma of the zoom lens according to Embodiment 1 at the telephoto end.

FIGS. 2A–2C show the spherical aberration, astigmatism, and distortion, respectively, of the zoom lens of Embodiment 1 at the wide-angle end. FIG. 3 shows the coma of the zoom lens of Embodiment 1 at the wide-angle end for various half-field angles ω for both the tangential (left column) and sagittal (right column) image surfaces at a wavelength of 540 nm. FIGS. 4A–4C show the spherical aberration, astigmatism, and distortion, respectively, of the zoom lens of Embodiment 1 at the telephoto end. FIG. 5 shows the coma of the zoom lens of Embodiment 1 at the telephoto end for various half-field angles ω for both the tangential (left column) and sagittal (right column) image surfaces at a wavelength of 540 nm. In FIGS. 2A and 4A, the spherical aberration is shown for the wavelengths 420 nm, 540 nm, and 680 nm. In FIGS. 2B, 2C, 4B, and 4C, ω is the half-field angle. In FIGS. 2B and 4B, the astigmatism is shown for the sagittal image surface S and the tangential image surface T. In FIGS. 2C and 4C, distortion is measured at 540 nm. As is apparent from these figures, the various aberrations are favorably corrected over the entire range of zoom.

Embodiment 2

Embodiment 2 is very similar to Embodiment 1 and therefore only the differences between Embodiment 2 and Embodiment 1 will be explained. Embodiment 2 differs from Embodiment 1 in its lens element configuration by different radii of curvature of lens surfaces, different aspheric coefficients of the aspheric lens surfaces, and different optical element surface spacings.

Table 5 below lists numerical values of lens data for Embodiment 2 based on the focal length of the two-group zoom lens being normalized to 98 mm. Table 5 lists the surface number #, in order from the object side, the radius of curvature R (in mm) of each surface near the optical axis, the on-axis surface spacing D (in mm), as well as the refractive index $N_d$ and the Abbe number $V_d$ (at the d-line of 587.6 nm) of each lens element for Embodiment 2. The numerical values for the radii of curvature of aspheric lens surfaces in Table 5 are the values near the optical axis. In Table 5, the radius of curvature is set at infinity (∞) when the optical element surface is planar or when the optical element surface does not refract the light.

TABLE 5

| # | R | D | $N_d$ | $\nu_d$ |
|---|---|---|---|---|
| 1* | 4185.409 | 29.80 | 1.50842 | 56.7 |
| 2* | 81.763 | 85.57 | | |
| 3 | 163.769 | 32.91 | 1.76181 | 26.6 |
| 4 | 216.153 | $D_4$ (variable) | | |
| 5 | ∞ (stop) | 19.94 | | |
| 6* | 118.490 | 46.42 | 1.50842 | 56.7 |
| 7* | −509.921 | 31.35 | | |
| 8 | ∞ | 16.98 | 1.83400 | 37.1 |
| 9 | 92.971 | 64.61 | 1.48749 | 70.4 |
| 10 | −184.660 | $D_{10}$ (variable) | | |

The lens surfaces with a * to the right of the surface number in Table 5 are aspheric lens surfaces, and the aspheric surface shape of these lens elements is expressed by Equation (A) above.

Table 6 below lists the values of the constants K, $A_4$, $A_6$, $A_8$, and $A_{10}$ used in Equation (A) above for each of the aspheric surfaces indicated in Table 5. Aspheric coefficients that are not present in Table 6 are zero. An "E" in the data indicates that the number following the "E" is the exponent to the base 10. For example, "1.0E-02" represents the number $1.0\times10^{-2}$.

TABLE 6

| # | K | $A_4$ | $A_6$ | $A_8$ | $A_{10}$ |
|---|---|---|---|---|---|
| 1 | 1.3213135 | 0.1155903E−7 | −0.4872768E−12 | 0.6174349E−17 | 0.1443784E−22 |
| 2 | −0.2735398 | 0.1613001E−6 | 0.8066306E−12 | 0.5609367E−18 | 0.2241208E−24 |
| 6 | 1.1813229 | −0.4080950E−7 | −0.2668800E−12 | −0.5052800E−16 | 0.1286322E−20 |
| 7 | −3.0665890 | 0.6657373E−7 | 0.2052605E−11 | 0.4855623E−16 | 0.2086729E−20 |

In the zoom lens of Embodiment 2, both the first lens group $G_1$ and the second lens group $G_2$ move during zooming. Therefore, the on-axis spacing $D_4$ between the two lens groups changes with zooming. With zooming, the focal length f, the back focus distance $D_{10}$, and the f-number of the zoom lens also change. The back focus distance $D_{10}$, is based on the plane parallel plate 2 of FIG. 1 having a thickness of 12.11 mm and a refractive index of 1.52. Table 7 below lists the values of the focal length f, the f-number $F_{NO}$, the on-axis surface spacing $D_4$, the back focus distance $D_{10}$, and the field angle 2ω at the wide-angle end (f=98 mm) and at the telephoto end (f=289.1 mm).

TABLE 7

| f | $F_{NO}$ | $D_4$ | $D_{10}$ | 2ω |
|---|---|---|---|---|
| 98 | 3.1 | 412.98 | 235.17 | 64.4° |
| 289.1 | 4.8 | 51.7453 | 422.93 | 24.6° |

Table 7 shows a zoom ratio of 2.95 from the wide-angle end to the telephoto end. Additionally, the overall length of the two-group zoom lens at the wide-angle end is 976 mm based on the normalized focal length of the two-group zoom lens being 98 mm.

The zoom lens of Embodiment 2 of the present invention satisfies Conditions (1)–(7) above as set forth in Table 8 below.

TABLE 8

| Condition No. | Condition | Values |
|---|---|---|
| (1) | $B^{1/2} < f_{G2}/f_W < 0.9 \cdot B$ | $f_{G2}/f_W = 2.422$; B = 2.95 |
| (2) | $-2.0 < f_{G1-1}/f_W < -1.5$ | −1.639 |
| (3) | $R_{G2-1}/f_W > 0.8$ | 1.185805 |
| (4) | $\mid f_{G1}/f_W \mid < 3 \cdot B$ | $\mid f_{G1}/f_W \mid = 2.322$; B = 2.95 |
| (5), (6) | $\mid f_W/R_1 \mid < 0.08$ (<0.025) | 0.023874 |
| (7) | $10 < \mid f_{G2-2,3}/f_W \mid < 100$ | 14.6148 |

Figure 6A:
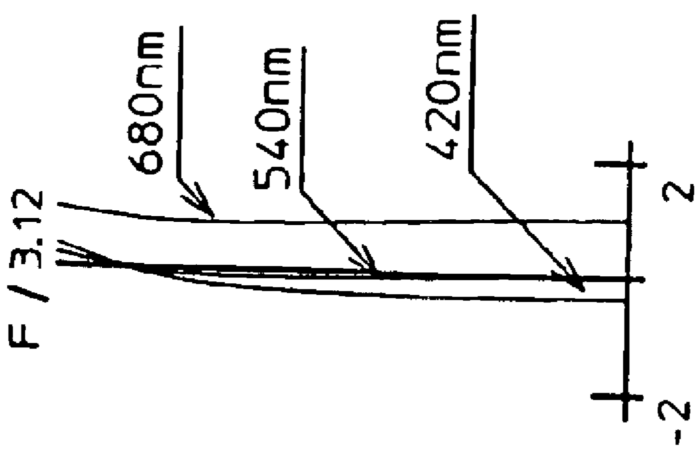
FIGS. 6A–6C show spherical aberration, astigmatism, and distortion, respectively, of the zoom lens according to Embodiment 2 at the wide-angle end.
Figure 6B:
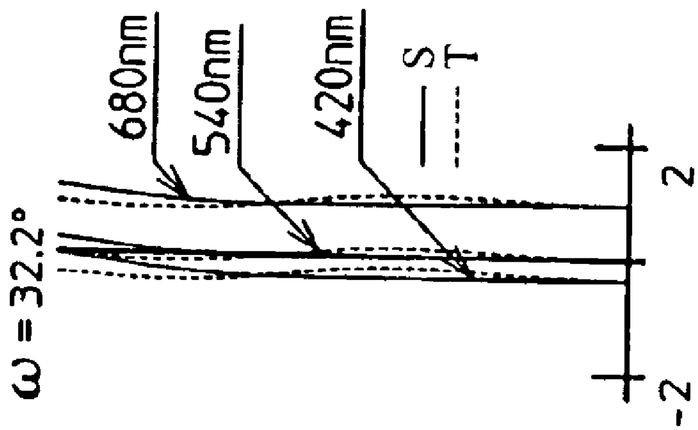
Figure 6C:
Figure 7:
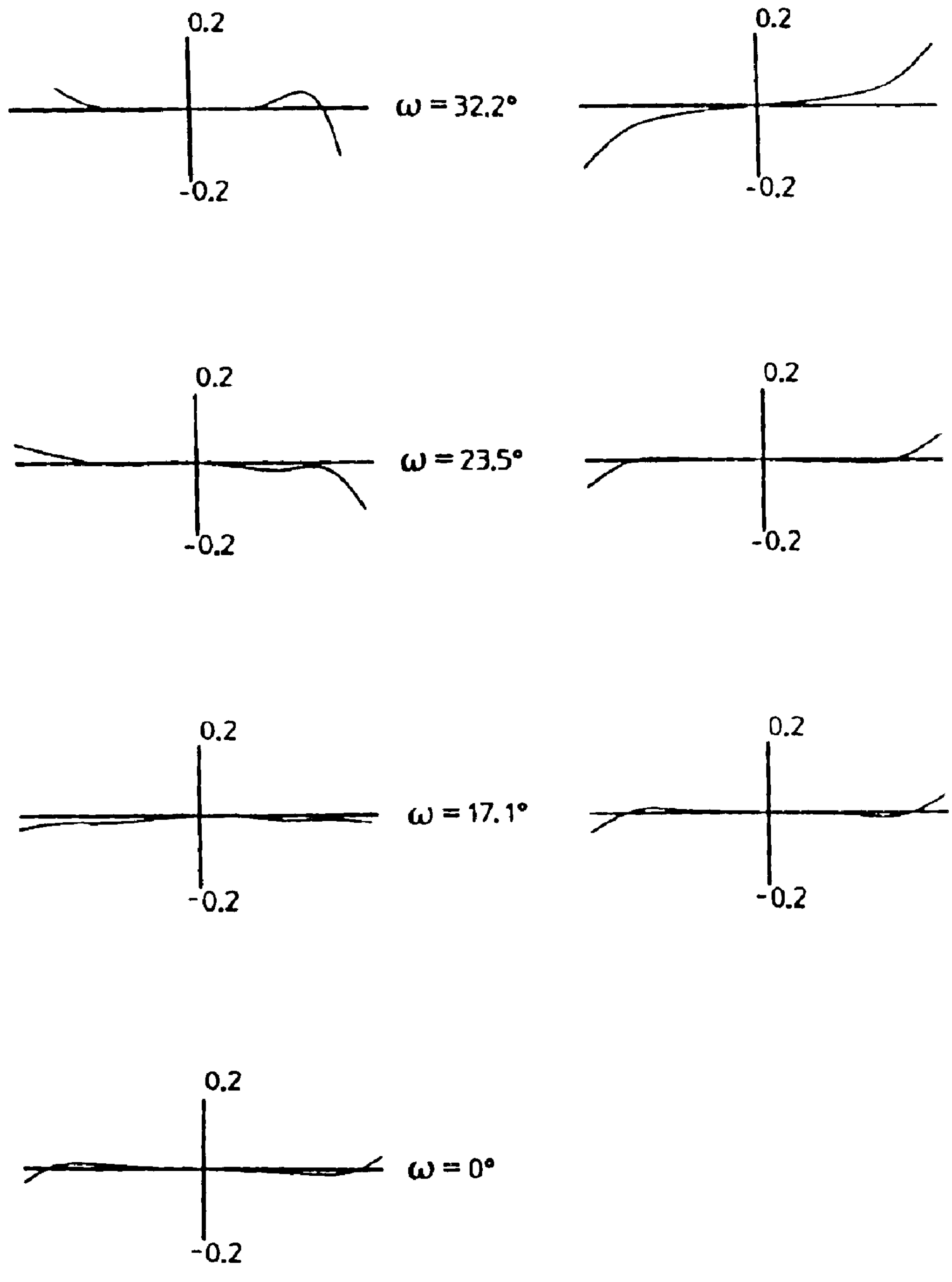
FIG. 7 shows the coma of the zoom lens according to Embodiment 2 at the wide-angle end.
Figure 8A:
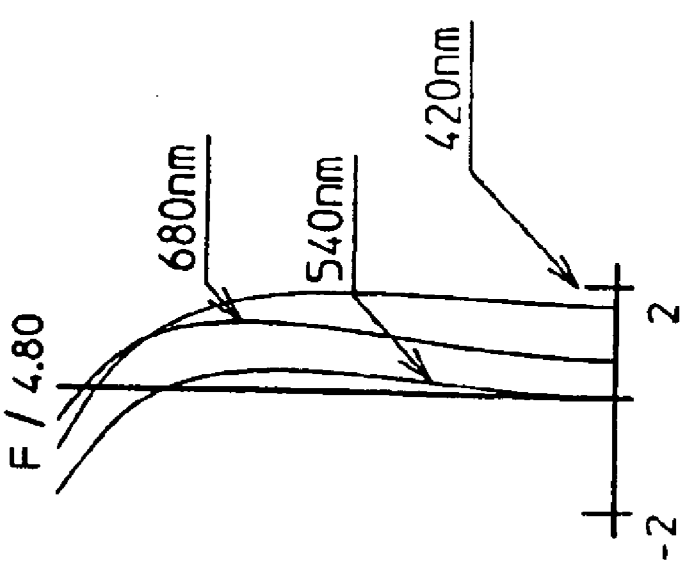
FIGS. 8A–8C show spherical aberration, astigmatism, and distortion, respectively, of the zoom lens according to Embodiment 2 at the telephoto end.
Figure 8B:
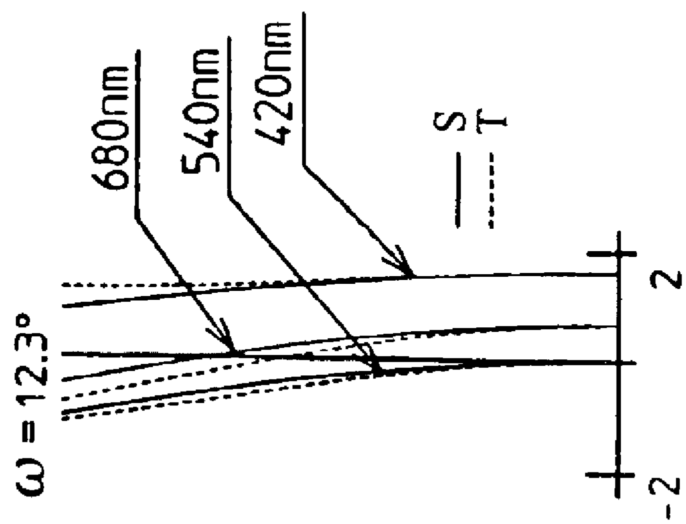
Figure 8C:
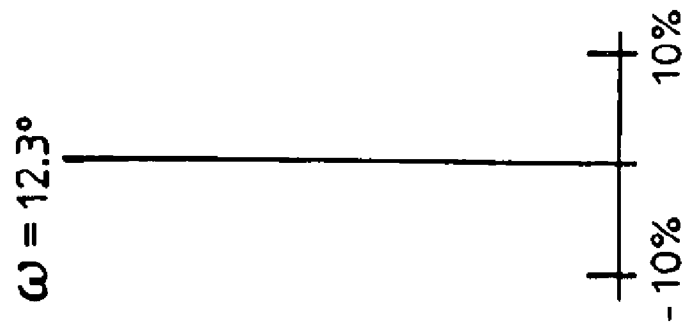
Figure 9:
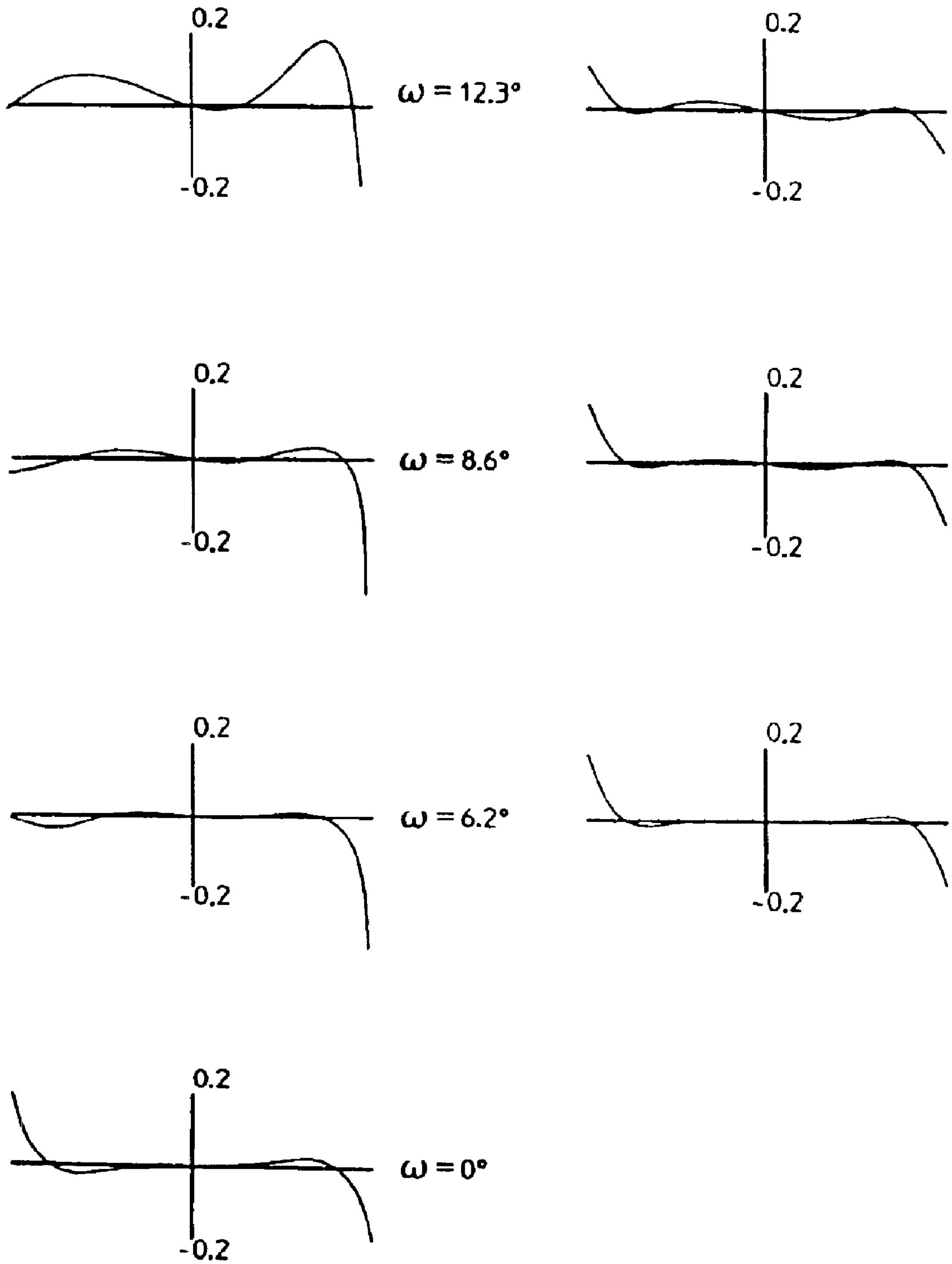
FIG. 9 shows the coma of the zoom lens according to Embodiment 2 at the telephoto end.

FIGS. 6A–6C show the spherical aberration, astigmatism, and distortion, respectively, of the zoom lens of Embodiment 2 at the wide-angle end. FIG. 7 shows the coma of the zoom lens of Embodiment 2 at the wide-angle end for various half-field angles ω for both the tangential (left column) and sagittal (right column) image surfaces at a wavelength of 540 nm. FIGS. 8A–8C show the spherical aberration, astigmatism, and distortion, respectively, of the zoom lens of Embodiment 2 at the telephoto end. FIG. 9 shows the coma of the zoom lens of Embodiment 2 at the telephoto end for various half-field angles ω for both the tangential (left column) and sagittal (right column) image surfaces at a wavelength of 540 mm. In FIGS. 6A and 8A, the spherical aberration is shown for the wavelengths 420 nm, 540 nm, and 680 mm. In FIGS. 6B, 6C, 8B, and 8C, ω is the half-field angle. In FIGS. 6B and 8B, the astigmatism is shown for the sagittal image surface S and the tangential image surface T. In FIGS. 6C and 8C, distortion is measured at 540 mm. As is apparent from these figures, the various aberrations are favorably corrected over the entire range of zoom.

Embodiment 3

Embodiment 3 is very similar to Embodiment 1 and therefore only the differences between Embodiment 3 and Embodiment 1 will be explained. Embodiment 3 differs from Embodiment 1 in its lens element configuration by different radii of curvature of lens surfaces, different eccentricities and different aspheric coefficients of the aspheric lens surfaces, different optical element surface spacings, and one different refractive index and Abbe number. As in Embodiment 1, the numerical values of lens data for Embodiment 3 is based on the focal length of the two-group zoom lens being normalized to 100 mm.

Table 9 below lists numerical values of lens data for Embodiment 3 based on the focal length of the two-group zoom lens being normalized to 100 mm. Table 9 lists the surface number #, in order from the object side, the radius of curvature R (in mm) of each surface near the optical axis, the on-axis surface spacing D (in mm), as well as the refractive index $N_d$ and the Abbe number $V_d$ (at the d-line of 587.6 nm) of each lens element for Embodiment 3. The numerical values for the radii of curvature of aspheric lens surfaces in Table 9 are the values near the optical axis. In Table 9, the radius of curvature is set at infinity (∞) when the optical element surface is planar or when the optical element surface does not refract the light.

TABLE 9

| # | R | D | $N_d$ | $\nu_d$ |
|---|---|---|---|---|
| 1* | 2238.588 | 29.66 | 1.50842 | 56.3 |
| 2* | 81.523 | 85.84 | | |
| 3 | 161.430 | 29.66 | 1.74077 | 27.8 |
| 4 | 211.873 | $D_4$ (variable) | | |
| 5 | ∞ (stop) | 42.57 | | |
| 6* | 113.777 | 45.37 | 1.50842 | 56.3 |
| 7* | −527.853 | 28.61 | | |
| 8 | ∞ | 18.67 | 1.83400 | 37.1 |
| 9 | 89.055 | 62.81 | 1.48749 | 70.4 |
| 10 | −183.900 | $D_{10}$ (variable) | | |

The lens surfaces with a * to the right of the surface number in Table 9 are aspheric lens surfaces, and the aspheric surface shape of these lens elements is expressed by Equation (A) above.

Table 10 below lists the values of the constants K, $A_4$, $A_6$, $A_8$, and $A_{10}$ used in Equation (A) above for each of the aspheric surfaces indicated in Table 9. Aspheric coefficients that are not present in Table 10 are zero. An "E" in the data indicates that the number following the "E" is the exponent to the base 10. For example, "1.0E-02" represents the number $1.0 \times 10^{-2}$.

TABLE 10

| # | K | $A_4$ | $A_6$ | $A_8$ | $A_{10}$ |
|---|---|---|---|---|---|
| 1 | 1.3265017 | 0.1108616E−7 | −0.4311875E−12 | 0.4325617E−17 | 0.1016506E−22 |
| 2 | −0.3330598 | 0.1781621E−6 | 0.6861265E−12 | 0.3116119E−18 | 0.8563170E−25 |
| 6 | 1.1215964 | −0.3632382E−7 | −0.3762618E−12 | −0.5284419E−16 | 0.1366602E−20 |
| 7 | −2.8841543 | 0.7528045E−7 | 0.2051340E−11 | 0.5079908E−16 | 0.2216854E−20 |

In the zoom lens of Embodiment 3, both the first lens group $G_1$ and the second lens group $G_2$ move during zooming. Therefore, the on-axis spacing $D_4$ between the two lens groups changes with zooming. With zooming, the focal length f, the back focus distance $D_{10}$, and the f-number of the zoom lens also change. The back focus distance $D_{10}$ is based on the plane parallel plate 2 of FIG. 1 having a thickness of 12.11 and a refractive index of 1.52. Table 11 below lists the values of the focal length f, the f-number $F_{NO}$, the on-axis surface spacing $D_4$, the back focus distance $D_{10}$, and the field angle 2ω at the wide-angle end (f=100 mm) and at the telephoto end (f=280 mm).

TABLE 11

| f | $F_{NO}$ | $D_4$ | $D_{10}$ | 2ω |
|---|---|---|---|---|
| 100 | 3.14 | 387.54 | 232.65 | 64.4° |
| 280 | 4.8 | 28.50 | 416.35 | 24.8° |

Table 11 shows a zoom ratio of 2.8 from the wide-angle end to the telephoto end. Additionally, the overall length of the two-group zoom lens at the wide-angle end is 970 mm based on the normalized focal length being 100 mm.

The zoom lens of Embodiment 3 of the present invention satisfies Conditions (1)–(5) and (7) above as set forth in Table 12 below.

TABLE 12

| Condition No. | Condition | Values |
|---|---|---|
| (1) | $B^{1/2} < f_{G2}/f_W < 0.9 \cdot B$ | $f_{G2}/f_W = 2.395$, $B = 2.8$ |
| (2) | $-2.0 < f_{G1-1}/f_W < -1.5$ | −1.670 |
| (3) | $R_{G2-1}/f_W > 0.8$ | 1.13777 |
| (4) | $\mid f_{G1}/f_W \mid < 3 \cdot B$ | $\mid f_{G1}/f_W \mid = 2.337$, $B = 2.8$ |
| (5) | $\mid f_W/R_1 \mid < 0.08$ | 0.0446376 |
| (7) | $10 < \mid f_{G2-2,3}/f_W \mid < 100$ | 12.0403 |

Figure 10C:
FIGS. 10A–10C show the spherical aberration, astigmatism, and distortion, respectively, of the zoom lens according to Embodiment 3 at the wide-angle end.
Figure 10B:
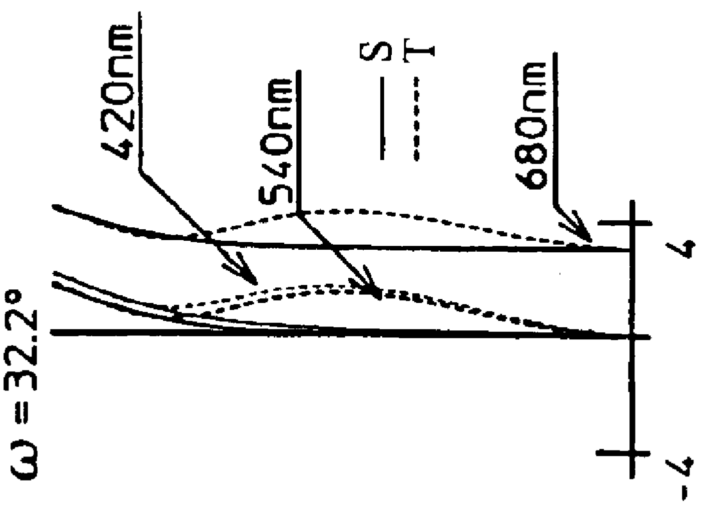
Figure 10A:
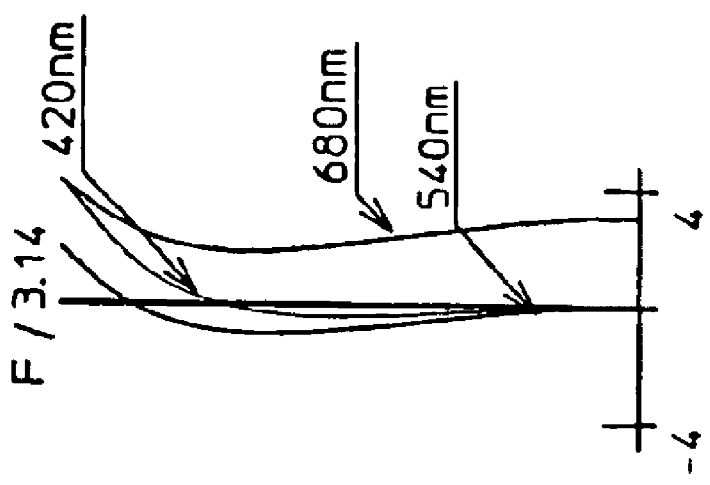
Figure 11:
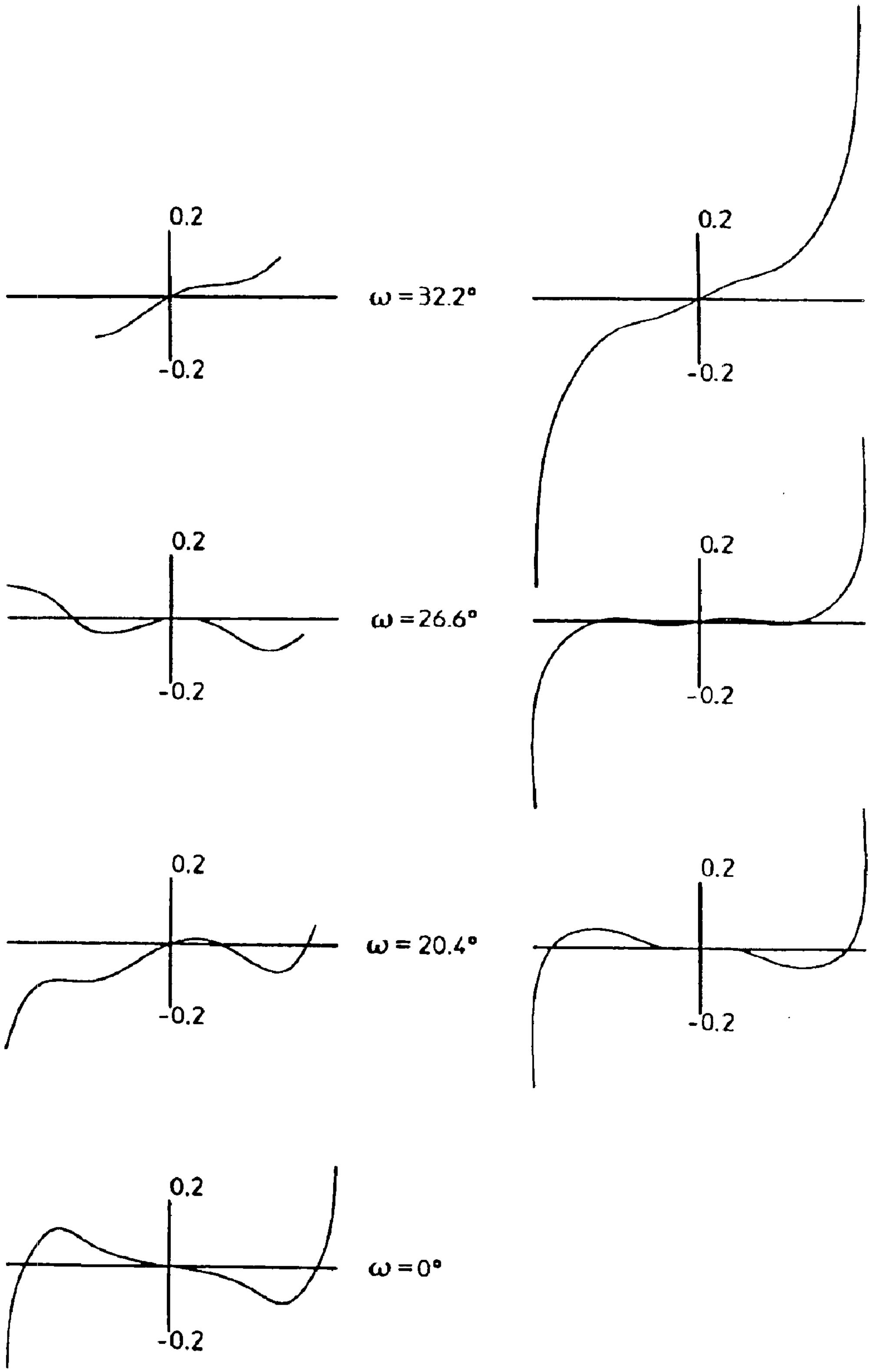
FIG. 11 shows the coma of the zoom lens according to Embodiment 3 at the wide-angle end.
Figure 12A:
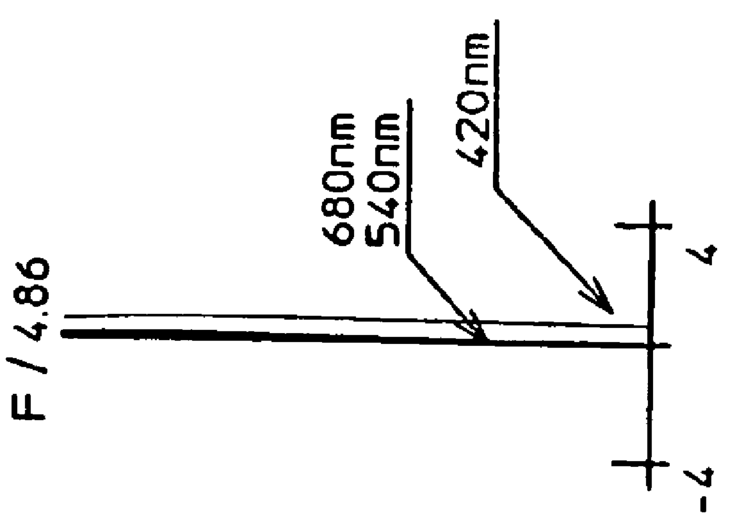
FIGS. 12A–12C show the spherical aberration, astigmatism, and distortion, respectively, of the zoom lens according to Embodiment 3 at the telephoto end.
Figure 12B:
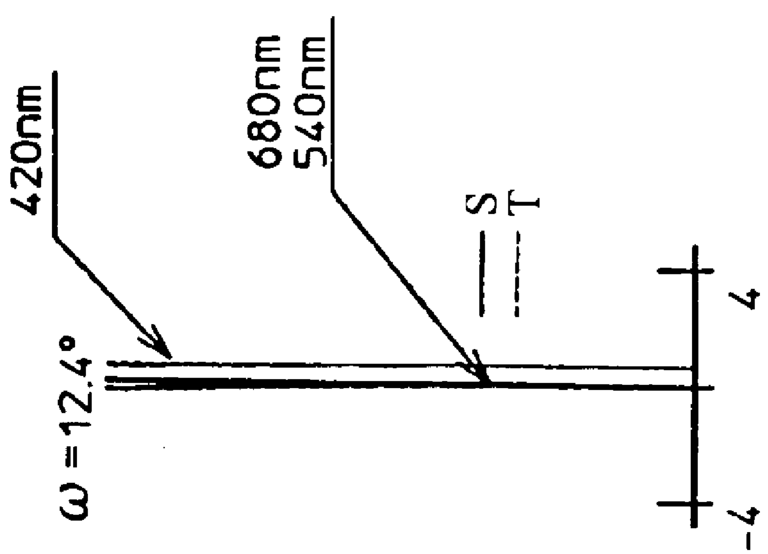
Figure 12C:
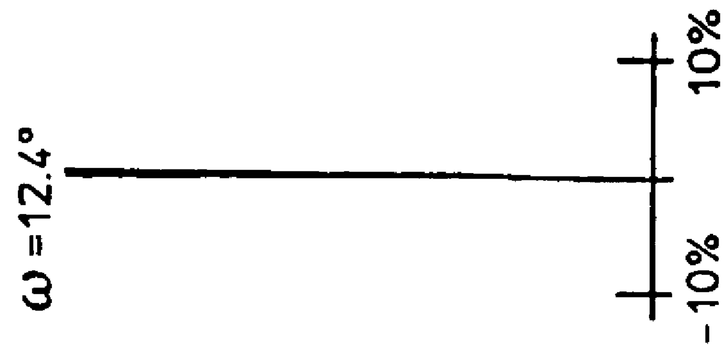
Figure 13:
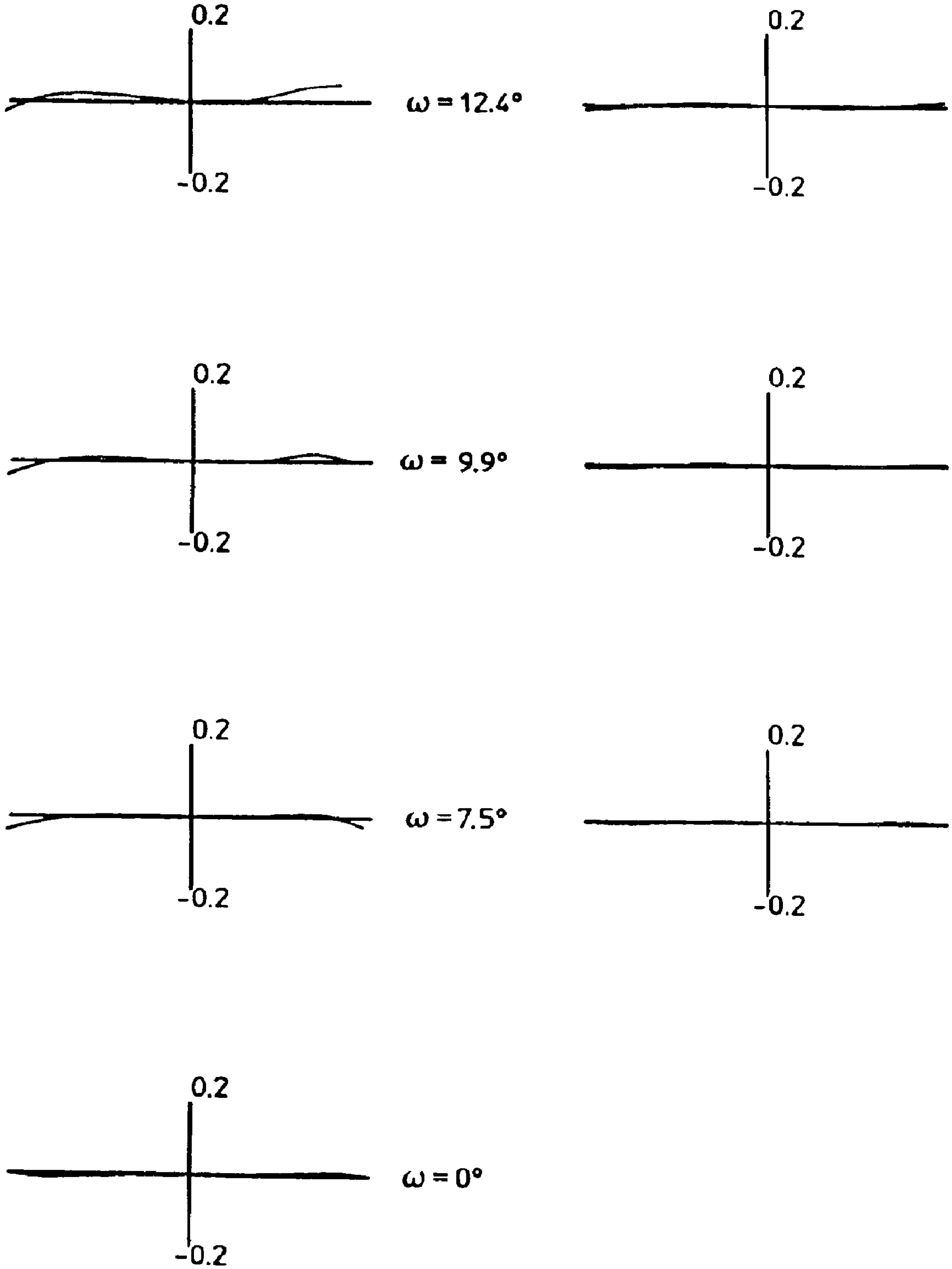
FIG. 13 shows the coma of the zoom lens according to Embodiment 3 at the telephoto end.

FIGS. 10A–10C show the spherical aberration, astigmatism, and distortion, respectively, of the zoom lens of Embodiment 3 at the wide-angle end. FIG. 11 shows the coma of the zoom lens of Embodiment 3 at the wide-angle end for various half-field angles ω for both the tangential (left column) and sagittal (right column) image surfaces at a wavelength of 540 nm. FIGS. 12A–12C show the spherical aberration, astigmatism, and distortion, respectively, of the zoom lens of Embodiment 3 at the telephoto end. FIG. 13 shows the coma of the zoom lens of Embodiment 3 at the telephoto end for various half-field angles ω for both the tangential (left column) and sagittal (right column) image surfaces at a wavelength of 540 nm. In FIGS. 10A and 12A, the spherical aberration is shown for the wavelengths 420 nm, 540 nm, and 680 nm. In FIGS. 10B, 10C, 12B, and 12C, ω is the half-field angle. In FIGS. 10B and 12B, the astigmatism is shown for the sagittal image surface S and the tangential image surface T. In FIGS. 10C and 12C, distortion is measured at 540 nm. As is apparent from these figures, the various aberrations are favorably corrected over the entire range of zoom.

The present invention is not limited to the aforementioned embodiments, as it will be obvious that various alternative implementations are possible. For instance, values such as the radius of curvature R of each of the lens components, the shapes of the aspheric lens surfaces, the surface spacings D, the refractive indices $N_d$, and Abbe number $v_d$ of lens elements are not limited to those indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens formed of only two lens groups, in order from the object side, as follows:

a first lens group; and a second lens group;

wherein the first lens group includes, in order from the object side: a first lens component of negative refractive power that is made of plastic and has at least one aspheric lens surface; and a second lens component of positive refractive power;

the second lens group includes, in order from the object side: a stop; a first lens component consisting of a first lens element having a biconvex shape and made of plastic with at least one lens surface aspheric; and a second lens component that includes, in order from the object side, a lens element having negative refractive power with the absolute value of the curvature of its object-side lens surface being smaller than the absolute value of the curvature of its image-side lens surface, said lens element being joined at said image-side lens surface to a lens element having a biconvex shape; and the following conditions are satisfied:

$$B^{1/2}<f_{G2}/f_w<0.9\cdot B$$

$$-2.0<f_{G1-1}/f_W<-1.5$$

$$R_{G2-1}/f_W>0.8$$

$$|f_{G1}/f_W|<3\cdot B$$

where

B is the zoom ratio of the zoom lens, namely, the ratio of the focal length at the telephoto end divided by the focal length at the wide-angle end, $f_{G2}$ is the focal length of the second lens group, $f_w$ is the focal length of the zoom lens at the wide-angle end, $f_{G1-1}$ is the focal length of the first lens component of the first lens group, $R_{G2-1}$ is the radius of curvature of the object-side lens surface of the first lens element of the second lens group, and $f_{G1}$ is the focal length of the first lens group.

2. The zoom lens of claim 1, wherein the first lens group consists of the first lens component of the first lens group and the second lens component of the first lens group.

3. The zoom lens of claim 1, wherein each of the first lens component of the first lens group and the second lens component of the first lens group consists of a lens element.

4. The zoom lens of claim 2, wherein each of the first lens component of the first lens group and the second lens component of the first lens group consists of a lens element.

5. The zoom lens of claim 1, wherein the second lens group consists of three lens elements.

6. The zoom lens of claim 5, wherein the first lens group consists of the first lens component of the first lens group and the second lens component of the first lens group.

7. The zoom lens of claim 5, wherein each of the first lens component of the first lens group and the second lens component of the first lens group consists of a lens element.

8. The zoom lens of claim 6, wherein each of the first lens component of the first lens group and the second lens component of the first lens group consists of a lens element.

9. A zoom lens formed of only two lens groups, arranged along an optical axis in order from the object side as follows:

a first lens group; and a second lens group;

wherein the first lens group includes, arranged along the optical axis in order from the object side, a first lens component made of plastic, having negative refractive power, and having at least one aspheric lens surface, and a second lens component having positive refractive power;

the second lens group includes, in order from the object side: a stop; a first lens component consisting of a first lens element with a biconvex shape that is made of plastic and has at least one aspheric lens surface; and a second lens component that includes, in order from the object side, a lens element of negative refractive power with the absolute value of the curvature of its object-side lens surface being smaller than the absolute value of the curvature of its image-side lens surface, said lens element being joined at said image-side lens surface to a lens element having a biconvex shape;

focusing is performed by movement of the second lens group along the optical axis; and the following conditions are satisfied:

$$B^{1/2}<f_{G2}/f_w<0.9\cdot B$$

$$-2.0<f_{G1-1}/f_W<-1.5$$

$$R_{G2-1}/f_W>0.8$$

$$|f_W/R_1|<0.08$$

$$10<|f_{G2-2,3}/f_W|<100$$

where

B is the zoom ratio of the zoom lens, namely, the ratio of the focal length at the telephoto end divided by the focal length at the wide-angle end, $f_{G2}$ is the focal length of the second lens group, $f_w$ is the focal length of the zoom lens at the wide-angle end, $f_{G1-1}$ is the focal length of the first lens component of the first lens group, $R_{G2-1}$ is the radius of curvature of the object-side lens surface of the first lens element of the second lens group, $R_1$ is the radius of curvature of the object-side lens surface of the first lens component of the first lens group, and $f_{G2-2,3}$ is the composite focal length of the joined lens elements of the second lens group.

10. The zoom lens of claim 9, wherein the first lens group consists of the first lens component of the first lens group and the second lens component of the first lens group.

11. The zoom lens of claim 9, wherein each of the first lens component of the first lens group and the second lens component of the first lens group consists of a lens element.

12. The zoom lens of claim 10, wherein each of the first lens component of the first lens group and the second lens component of the first lens group consists of a lens element.

13. The zoom lens of claim 9, wherein the second lens group consists of three lens elements.

14. The zoom lens of claim 13, wherein the first lens group consists of the first lens component of the first lens group and the second lens component of the first lens group.

15. The zoom lens of claim 13, wherein each of the first lens component of the first lens group and the second lens component of the first lens group consists of a lens element.

16. The zoom lens of claim 14, wherein each of the first lens component of the first lens group and the second lens component of the first lens group consists of a lens element.

17. The zoom lens of claim 1, wherein at least three lens surfaces of the zoom lens are aspheric lens surfaces.

18. The zoom lens of claim 9, wherein at least three lens surfaces of the zoom lens are aspheric lens surfaces.

19. The zoom lens of claim 1, wherein the following condition is satisfied:

$$|f_W/R_1|<0.025$$

where $R_1$ is the radius of curvature of the object-side lens surface of the first lens element of the first lens component of the first lens group.

20. The zoom lens of claim 9, wherein the following condition is satisfied:

$$|f_W/R_1|<0.025.$$

* * * * *